UNITED STATES PATENT OFFICE.

HAYWARD A. HARVEY, OF ORANGE, NEW JERSEY, ASSIGNOR TO THE HARVEY STEEL COMPANY, OF NEW YORK, N. Y., AND NEWARK, NEW JERSEY.

COMPOSITION FOR SUPERCARBURIZING STEEL, &c.

SPECIFICATION forming part of Letters Patent No. 498,390, dated May 30, 1893.

Application filed January 28, 1893. Serial No. 460,155. (No specimens.)

*To all whom it may concern:*

Be it known that I, HAYWARD A. HARVEY, of Orange, New Jersey, have invented a certain Improvement in Compositions for Supercarburizing Steel During the Subjection of the Same to High Temperatures, of which the following is a specification.

This improvement relates to the composition of the body of carbonaceous material employed for supercarburizing steel in the process of treating low steel, described in United States Letters Patent No. 376,194, issued to Hayward A. Harvey January 10, 1888, and also during the process of manufacturing decrementally hardened armor-plate, described in United States Letters Patent No. 460,262, issued to Hayward A. Harvey September 29, 1891. In said processes, in which the steel under treatment is subjected to intense heat, it is essential to completely exclude oxygen from the heated metal, and charcoal in the form of fine powder is the best material for the carbonaceous body. Several objections have heretofore been experienced in such use of finely powdered charcoal. It has been found necessary to deeply embed in the powdered charcoal the metal to be treated because of the tendency of masses of powdered charcoal to subsidence when heated. This has involved the employment of treating-chambers of undesirably large vertical dimensions and corresponding increase in the height of the furnace chambers. Another difficulty has arisen from the tendency of the finely powdered charcoal to fly off in dust when stirred or moved from place to place as it has to be when loading and unloading the treating-chamber. It is also the fact that for some reason, the nature of which is not fully understood, when fine wood charcoal alone is used and is subjected to high heat, explosions occasionally occur. These explosions are forcible enough to blow off the cover of a closed receptacle, or if the receptacle containing the fine charcoal is not closed and the charcoal is covered with a layer of sand and a superposed layer of fire brick, as described in Letters Patent of the United States No. 460,262, a species of ebullition is observed to take place in the granular mass by which the mass is loosened so as to diminish the firmness of its compression against the steel which is to be supercarburized. These difficulties are practically overcome by the present invention which consists in forming the carbonaceous body, which for present convenience may be called the treating bed, partly of finely powdered wood charcoal and partly of animal charcoal, preferably the so-called "spent char," from sugar refineries. The specific gravity of animal charcoal is nearly four times that of wood charcoal, and it is found that the presence of the animal charcoal lessens the extent of subsidence of the compressed mass of carbonaceous material when heated, diminishes the tendency of the finely powdered wood charcoal to fly off in dust when the mixture is handled either in the act of filling the chamber in which the heating operation is carried on, or in the act of emptying the said chamber preparatory to, or in connection with, the removal of the metal from the treating bed, and prevents the occurrence of the explosions referred to, by which the mass of treating material is mechanically disturbed. The proportion of animal charcoal employed is not absolute. Ten or fifteen per cent. causes an observable diminution in the quantity of dust arising under the circumstances referred to, and forty to fifty per cent. almost entirely prevents the escape of dust. The finely powdered wood charcoal occupies the interstices between the particles of animal charcoal. During the handling of the mixture the animal charcoal acts as a carrier for the finely powdered wood charcoal, and also acts as a shield, which to a greater or less extent prevents the finely powdered wood charcoal, or charcoal dust from escaping into the atmosphere. Owing to the inclusion in it of animal charcoal, the material of the treating bed is valuable for manufacture into fertilizers, for which purpose it can be readily sold after repeated use has caused it to part with its carbon to such an extent as to impair its effectiveness for the purposes herein mentioned.

What is claimed as the invention is—

The herein described treating bed for effecting the supercarburization of steel during the subjection of the same to high temperature, the same consisting of a mixture of finely powdered wood charcoal with animal charcoal, as and for the purposes set forth.

HAYWARD A. HARVEY.

Witnesses:
E. GATTERER,
A. M. JONES.